Nov. 1, 1966                    C. F. MURPHY                    3,283,251
          METHOD OF AIRCRAFT CONTROL AND AIRCRAFT RADIO
                 COMMUNICATIONS AND APPARATUS THEREFOR
Filed Oct. 11, 1963                                    4 Sheets-Sheet 2

INVENTOR.
CHARLES F. MURPHY
BY
ATTORNEYS

Nov. 1, 1966

C. F. MURPHY 3,283,251

METHOD OF AIRCRAFT CONTROL AND AIRCRAFT RADIO
COMMUNICATIONS AND APPARATUS THEREFOR

Filed Oct. 11, 1963

INVENTOR.
CHARLES F. MURPHY
BY
ATTORNEYS

Nov. 1, 1966          C. F. MURPHY                3,283,251
         METHOD OF AIRCRAFT CONTROL AND AIRCRAFT RADIO
              COMMUNICATIONS AND APPARATUS THEREFOR
Filed Oct. 11, 1963                              4 Sheets-Sheet 4
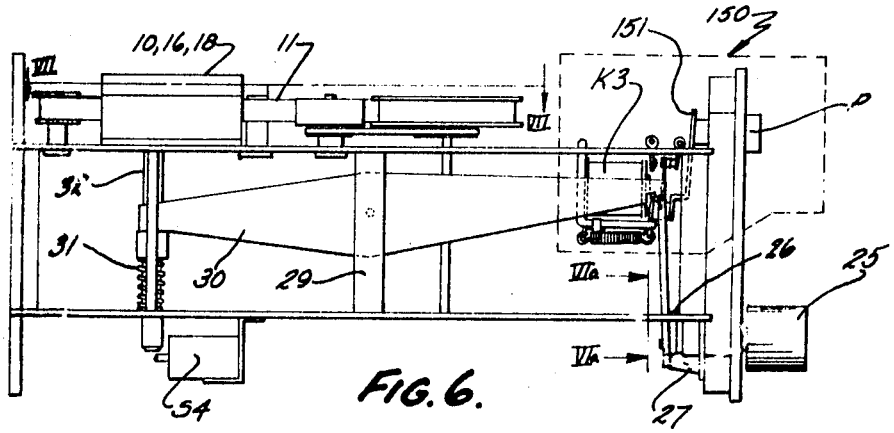
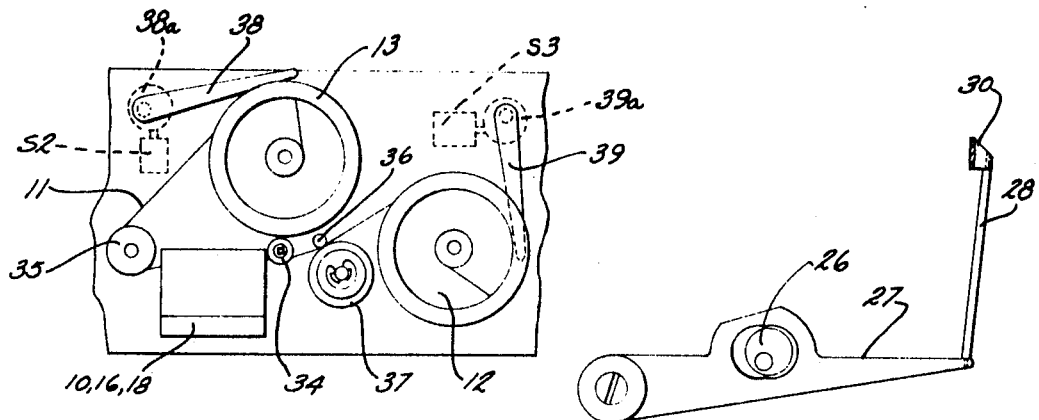
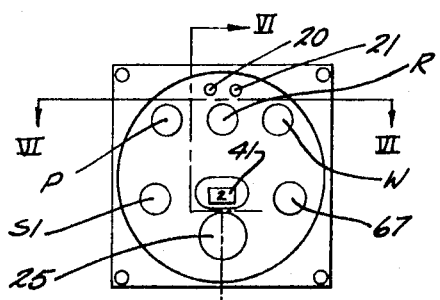
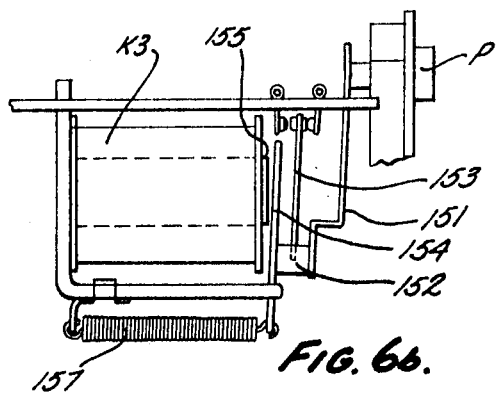
INVENTOR.
CHARLES F. MURPHY
BY
ATTORNEYS United States Patent Office 3,283,251
Patented Nov. 1, 1966

3,283,251
METHOD OF AIRCRAFT CONTROL AND AIRCRAFT RADIO COMMUNICATIONS AND APPARATUS THEREFOR
Charles F. Murphy, Vermontville, Mich., assignor to Michigan Magnetics, Inc., Vermontville, Mich., a corporation of Michigan
Filed Oct. 11, 1963, Ser. No. 315,550
2 Claims. (Cl. 325—66)

This invention relates to a method of aircraft control and a system of apparatus for aircraft radio communication, and more particularly to an aircraft radio instrument and system whereby radio communications being transmitted or received may simultaneously be recorded so as to obtain an exact copy of the information. The recorded copy so produced is used to effect instant retransmission of the information and is then stored for future reference. Such a system is especially applicable to the complex communications involved in the operation of aircraft.

In the operation of aircraft there is involved a great number of aural communications which serve to interconnect the aircraft, the flight control center, and various approach and landing control stations. These transmissions normally involve complex, technical information necessary for the safe and efficient flight of the aircraft and its guidance within the crowded traffic patterns that are a part of present day aviation.

Since the number and complexity of messages received by an aircraft in flight precluded memorization, it was previously necessary for the pilot or co-pilot to make written annotations of their content in order to preserve the same and have access to it as a subsequent guide in the operation of the aircraft. The information thus received and written down would then be reiterated to the sending source in order to check the accuracy of its transmission and interpretation by those in charge of the aircraft. This has long proved to be a cumbersome, time consuming, inaccurate, and dangerous procedure, since it must necessarily divert the attention of the pilot from the flight of the aircraft to the note writing and reiteration process just mentioned. Moreover, errors were often introduced by the very multiplicity of persons involved in the process. If these errors were not detected and corrected the result would obviously be disastrous, but even if detected the making of corrections would necessitate repeated transmissions which wasted valuable time and produced a most undesirable element of confusion.

The present invention affords a complete solution to the problem in a most efficacious manner by making available an effortless, exact recording of any desired communication, whether received or transmitted by the aircraft, which may be instantly transmitted back to the sending source in order to check the accuracy of its contents, and which is then subsequently available for as long as desired for replay to the operators of the aircraft.

An object of the invention is therefore to provide a compact, versatile recording device that is fully integrated with an aircraft communication system and which will selectively automatically monitor and record all incoming and outgoing radio communications.

It is another object of the present invention to provide a communication system which records desired transmissions simultaneously with their receipt or dispatch.

It is another object of the present invention to provide a communication system which automatically records desired transmissions and which will reiterate directly in aural form the contents of the transmissions to either or both sender and receiver.

Yet another object of the present invention is the provision of a unique indication of recording activity in the form of a softly muted echo heard by the pilot, slightly delayed in time from the primary communication.

A further object of this invention is the provision of a flexible aircraft communication system which makes available to the aircraft operator a recording instrument for the purpose of making aural memorandums of information he desires to use in the future, so that he need not endeavor to commit the same to memory, thus leaving his mind clear of matters extraneous to the actual operation of the aircraft.

Combined with the features of this invention is the availability of permanently recorded channels of standard information, such as checklists and the like, which are available at any time for replay, broadcast, or both simultaneously.

This invention also relates to the mechanisms associated with the recording apparatus, including the mechanism for selecting record, rewind or play modes, and the tape channel selector mechanism.

Other objects and advantages of the invention will more fully appear from the following description and drawings, wherein is disclosed a preferred embodiment of the invention, comprising generally a multi-channel magnetic tape recorder and its controlling circuitry completely integrated within an aircraft communication system. In the accompanying drawings:

FIG. 5 is a front view of the recording instrument, showing its external face configuration, indicators and control buttons.

FIG. 6 is a cutaway view taken along the plane of section lines VI—VI of FIG. 5, showing the channel selecting mechanism.

FIG. 6a is a simplified cutaway view taken along the plane of section lines VIa of FIG. 6, and serves to further illustrate the channel selecting mechanism.

FIG. 6b is an enlarged view, partially in cutaway, of the area within the dashed lines 150 of FIG. 6, showing in detail the construction of one of the recorder mode selecting relays, along with its actuating push-button control.

FIG. 7 is a simplified plan view of the exposed top of the unit shown in FIGS. 5 and 6 taken along the plane of section lines VII—VII of those figures.

The communication system and apparatus shown by the drawings and disclosed herein enables the operator of an aircraft at his option to effortlessly record any aural transmissions received by or sent from the aircraft, thus allowing him to utilize his absolute maximum efforts and attention in controlling the flight of the aircraft. The system and apparatus may also be used to quickly make exact aural memorandums of information the aircraft operator may desire to have close at hand in the future. Perhaps the ultimate advantage made possible by the present invention, however, is the facility of easy and fast transmission and retransmission of the recorded messages in the exact form in which they were originally received by the aircraft to any desired ground station at any desired time, either immediately upon receipt of the message, as to verify the accuracy of its contents, or at any subsequent time, as to aid in the proper guidance of the aircraft. As is normally desired, the operator may at his option listen to these transmissions of the recording, just as he listened to the original message which was simultaneously being recorded. The pilot at any time may replay the recording for his own purposes, whether the message is then being concurrently transmitted from the aircraft or not. Additionally, the pilot is provided with a unique positive indication of any recording activity he has inaugurated, in the form of a softly-muted echo of the message then being recorded, supplied to him slightly delayed in time from the actual message communicated.

Figure 1:
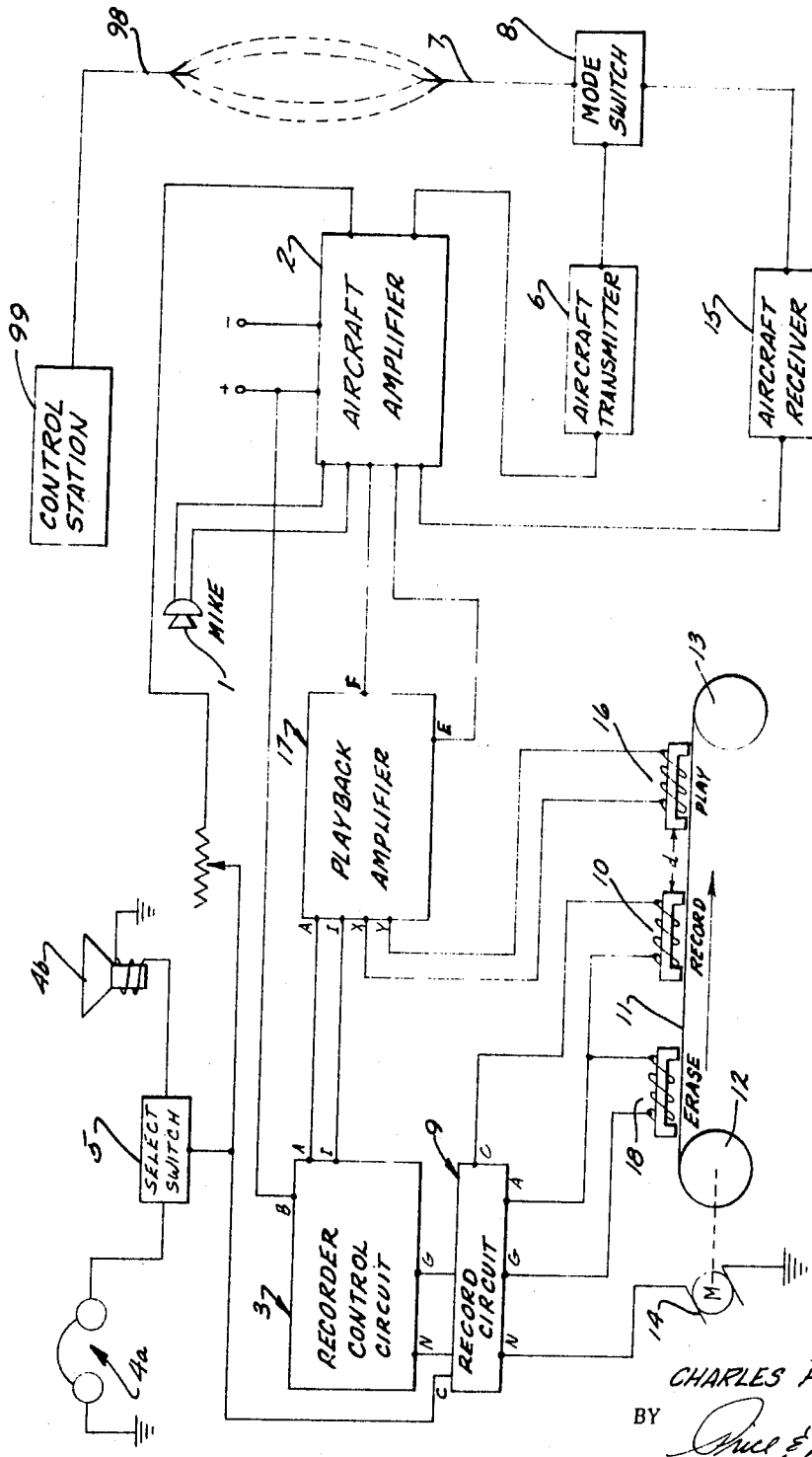
FIG. 1 is a block diagram of the basic system, showing the connections integrating the various elements into a composite, operable communication system.

Referring now in more detail to the drawings, in FIG. 1 is shown a complete aircraft communication system, composed of a microphone 1 which provides inputs to the aircraft amplifier 2 and the recorder control circuit 3, such that any message originating in the aircraft will be amplified and may if desired be heard on the earphones 4a, or the speaker 4b, as determined by the position of the selector switch 5, at the same time the message is being transmitted by operation of the aircraft transmitter 6 and antenna 7, in conjunction with the mode switch 8. Such a transmission may, at the option of the pilot, be recorded by momentarily depressing the record mode actuating switch (designated R in FIG. 5), which causes the recorder control circuit 3 to couple the microphone signal to the record circuit 9, from which it is impressed upon the magnetic recording head 10, and thereby recorded upon the tape 11, moving in the direction shown under the influence of a motor 14 and the winding drums 12 and 13. Similarly, an incoming signal received by the antenna 7 and receiver 15 will be amplified by the aircraft amplifier 2 and heard on either earphone or speaker, and this signal may at the option of the pilot be recorded in the same manner as are messages originating within the aircraft, discussed immediately above.

Recorded information is replayed by touching the play mode actuating switch (designated P in FIG. 5), which brings into operation the magnetic pickup, or play, head 16, by which the playback amplifier 17 receives an input signal through its connections X and Y. The signal so received is amplified by the playback amplifier 17, and is then coupled by connection F to the aircraft amplifier 2, whose output is transmitted by the transmitter 6 and antenna 7, in conjunction with the mode selection switch 8. The transmission may be heard within the aircraft on either earphones 4a or speaker 4b, as determined by the selector switch 5.

The erase head 18 is positioned ahead of the recording head 10 relative to the motion of the tape 11, and both erase and record heads are operated as a unit, being energized concurrently through the connection G to the record circuit 9. Thus, for a given channel, any previous recording is automatically erased just prior to the recordation of new intelligence.

The play head 16 is positioned a fixed distance $d$ behind the record head 10 relative to the motion of the tape 11. This length displacement is translated into a brief time delay whenever any message is being recorded, since the play head 16 picks up the message imparted to the tape 11 by the recording head 10 slightly subsequent to its recordation. The signal picked up by the play head 16 is amplified by the playback amplifier 17 and the aircraft amplifier 2, and is presented to the head phones 3 or speaker 4 as a muted echo of the words just previously spoken, thus providing a positive indication to the pilot that his message is being recorded.

*Recorder control circuit*

Figure 2:
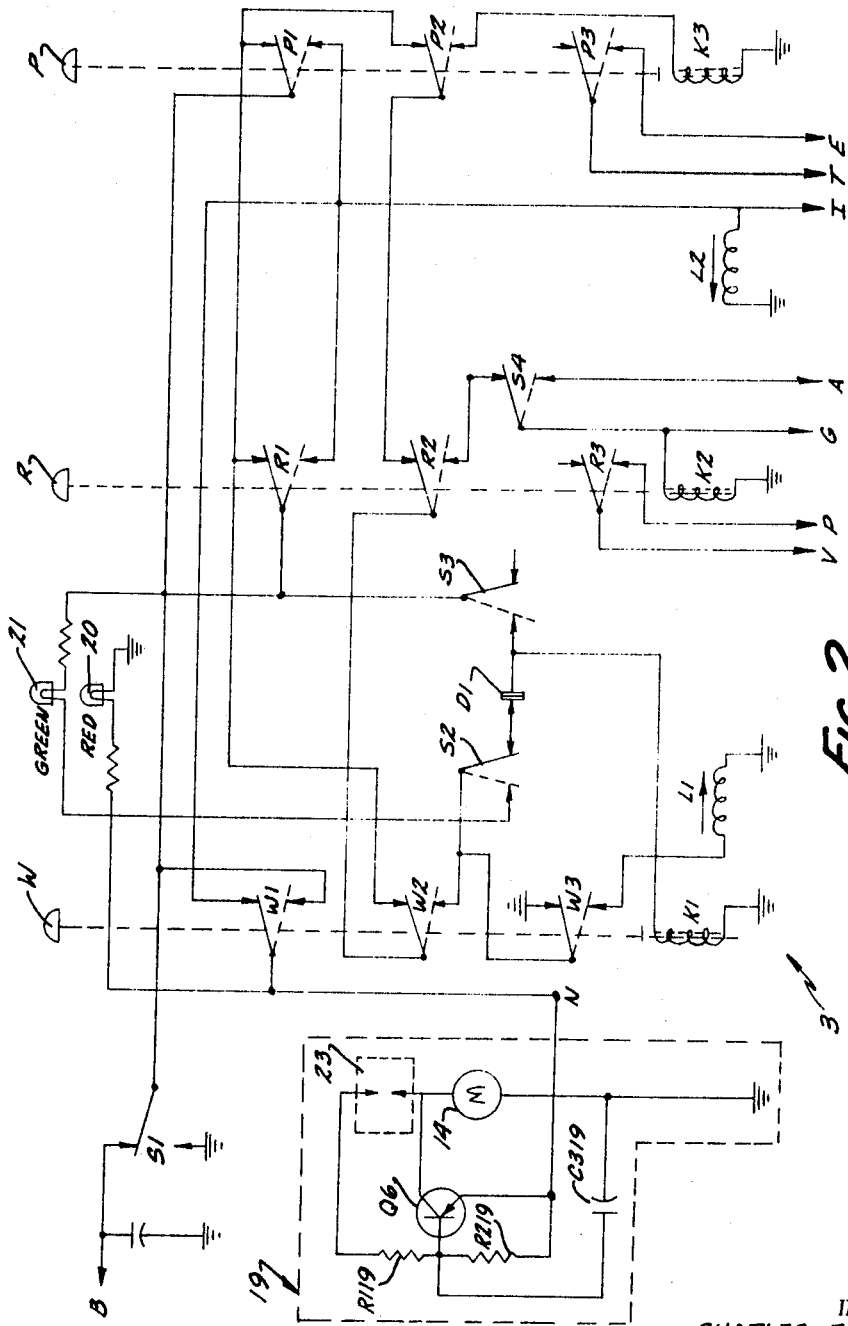
FIG. 2 is a schematic drawing of a representative recorder control circuit used within the integrated communication system, showing also the recorder motor and its unique speed control circuitry.

The recorder control circuit 3 of FIG. 1 is shown in detail in FIG. 2, and has three modes of operation, "Record," "Play," and "Rewind," controlled by the actuating control buttons R, P, and W, respectively (FIGS. 2 and 5). These actuating control buttons operate self energizing, holding relays K1, K2, and K3, each of which have ganged sets of relay contacts W1, W2, and W3, R1, R2 and R3, and P1, P2, and P3, respectively, shown by solid lines in the de-energized position and in phantom in the energized position. These relay contacts control the operation of the motor control circuit 19, rewind solenoid L1, and the play-record solenoid L2. They also control the energization of indicator lights 20 and 21, and the connection of circuit connector points A, P, G, I, and T in the entire system. The recorder control circuit is itself connected at circuit connection B to the aircraft power supply.

A stop switch S1 (FIGS. 2 and 5) located within the recorder control circuit 3 is used to control the inlet power supplied to this circuit. This switch is spring loaded so as to be normally in the closed position shown by FIG. 2. Thus the supply of inlet power is interrupted only when S1 is depressed, and the interruption so produced is temporary only, lasting as long as S1 is manually held open. When S1 is released its contacts spring back to the normally closed position and power is once again available to the circuit from connection B.

To record, control button R is depressed, with circuit operation as follows: direct current is supplied from point B through the stop switch S1. This current follows a path through the contacts R1, now in their energized position, and advances to the play-record solenoid L2 and also to circuit connection I (providing B+ voltage for the playback amplifier, as discussed below). A second path for current flow exists through contacts R1 and W1, which energizes the motor control circuit 19, and the motor 14, as discussed below, and a red indicator light 20. In parallel with the circuit just described is a path through contacts P1, W2, R2 and switch S4 to the record relay coil K2, thereby providing excitation of the same in a manner which, in conjunction with the operation of stop switch S1, as is more fully explained hereinafter, will continuously hold the contacts R1, R2, and R3 in an actuated position until the stop switch S1 is depressed, thereby momentarily interrupting the supply of actuating power. This path also supplies power to circuit connection G, whose purpose is later described. Finally, contacts R3, now in an energized position, connects to ground point P of the amplifier circuit of FIG. 3, thus connecting resistor R61 of FIG. 3 in parallel with resistors R62 and R63, thereby greatly lowering the effective output load of the emitter-follower third stage 60 so that only a small signal will be developed by this stage. Accordingly, only a small signal will be coupled to the output stage 70 by the transformer T1, and the resulting output of the amplifier 17 appearing at the terminals F and A and, as described previously in connection with FIG. 1, at the pilot's earphones 4a or speaker 4b will be a greatly attenuated version of the level normally present when the system is in the play mode. In this manner a muted echo of the message imposed upon the magnetic tape 11 by the magnetic recording head 10 will be supplied to the ears of the pilot as a result of the pickup by the play head 16 of the signal just previously imparted to the tape. Since the play head 16 is positioned slightly behind the record head 10 relative to the direction of tape travel, the muted echo supplied to the pilot will be slightly delayed in time from the words as actually spoken and recorded.

To effect replay of a given recording, the play control button P is actuated, thereby placing the play relay contacts in their energized position, with resulting circuit operation as follows. Direct current is supplied from point B through the stop switch S1 as before, and finds a path to the relay holding coil K3 through contacts R1, W2, R2, and P2, thereby energizing the said coil. In addition, a path is closed through contacts P1, which serves to energize the play-record solenoid, L2, and also to provide energy to circuit connection I, as in the record mode, discussed above. In parallel with the circuit branch last described, is a loop through contacts W1 serving to energize the motor 14 through the motor control circuit 19, along with the red indicating light 20. Contacts P3, having been placed in an energized position, connect point E to point T (FIGS. 2 and 3) and thereby make available an output of relatively small amplitude from the emitter-follower third stage 60 of playback amplifier 17 (FIG. 3), through amplifier components R64 and C61 to the amplifier connection E, which output is connected to the headphones 4a or speaker 4b of FIG. 1, for the purpose of allowing the pilot to directly monitor the message being replayed and transmitted by the combined operation of aircraft amplifier 2, aircraft transmitter 6, the mode select switch 8, and antenna 7.

In the rewind mode, relay mode select control button W of FIG. 5 having been first depressed, the recorder control circuit operates as follows. Direct current is available from point B to the stop switch S1 as before, and finds a path to the rewind clutch solenoid L1, through contacts P1, P2, R2, and W2, thereby energizing the solenoid windings. Simultaneously, a path is closed to the rewind relay holding coil K1, through contacts P1, P2, R2, W2, and the automatic stop switch S2, thus energizing the holding coil K1. At the same time, a further path is available through contacts W1, serving to energize the motor control circuit 19, the motor 14, and the red indicating light 20.

When the rewinding operation is completed, the automatic stop switch S2 is triggered, and serves to immediately open the circuit to, and thereby de-energize, the rewind relay holding coil K1, whose ganged contacts W1, W2, and W3 then resume their normal position as shown in solid lines (FIG. 2). Since contacts W2 are now opened, the rewind clutch solenoid L1 is de-energized, and contacts W1 being also opened, the motor 14 and motor control circuit 19 are de-energized, so that the motor ceases to run, and the red indicating light 20 goes out. The system is now in a static state, awaiting actuation from either play or record mode actuating push-buttons P or R and the green light 20 is on.

An automatic rewind switch S3 is provided in the recorder control circuit, which will be actuated automatically when the extremity of any given tape channel is reached, as the system is operated in either play or record mode. This automatic rewind switch S3 upon actuation completes a path for current which will energize the rewind mode relay holding coil K1, thereby automatically placing the system in the rewind mode discussed above, with operation identical to that just described under manually inaugurated rewind conditions.

*Motor control circuit*

The motor control circuit is shown enclosed within the dashed lines 19 of FIG. 2. It consists of a motor 14, an isochronous-type motor speed governor designated by the dashed lines 23, and speed governing circuitry including a transistor Q6, biasing resistors R119 and R219, and capacitor C319.

The motor control circuit 19 operates in the following manner. Direct current is made available at circuit connection point N through one of the three modes of operation of the recorder control circuit 3 just described, and is supplied to the motor 14 through the emitter and collector of transistor Q6. The base of transistor Q6 is partially biased by the current which will be amplified by the transistor and used to energize the motor, reduced however by the drop in potential across biasing resistor R219. The isochronous-type speed governor 23 is equipped with contacts which are set to open under automatic (mechanical) actuation at a predetermined speed. A feedback loop is provided through the isochronous governor contacts and resistor R119 which serves to add to the positive bias voltage already on the base of transistor Q6 a voltage proportional to the output current from the collector of Q6, which is being used to excite the motor 14.

Very accurate motor governing is achieved by this circuitry configuration in the following manner. As the isochronous governor contacts open at the predetermined speed, excitation of the motor 14 will be differentially reduced, since it is being supplied through a transistor whose base now is biased mainly by the voltage developed across resistor R219, and therefore the transistor is conducting less than previously. The rate of diminution in motor supply voltage is fixed by the RC time constant of resistor R119 and capacitor C319, since the latter component will absorb pulses resulting from the opening and closing of the isochronous governor contacts and then slowly discharge the energy from these pulses onto the base of Q6 in the form of exponentially decreasing bias voltage.

As the motor 14 senses the lower level of excitation being supplied to it, it will of course begin to slow its speed. As this occurs, the isochronous governor 23 senses the decreasing speed and again makes contact, serving to supply differentially increasing excitation to the motor due to the increased current flow through Q6 which has resulted from the additional positive bias now once again present at the base of the transistor, supplied through the feedback loop of the isochronous governor contacts and resistor R119. Thus, in spite of the sharp on-off governing produced by the isochronous governor alone, the motor receives constantly modulated and differentially supplied excitation, which reduces the possibility of introducing distortion into the system to an absolute and unmeasurable minimum by the provision of a motor which runs at an essentially exact constant speed.

*Playback amplifier*

Figure 3:
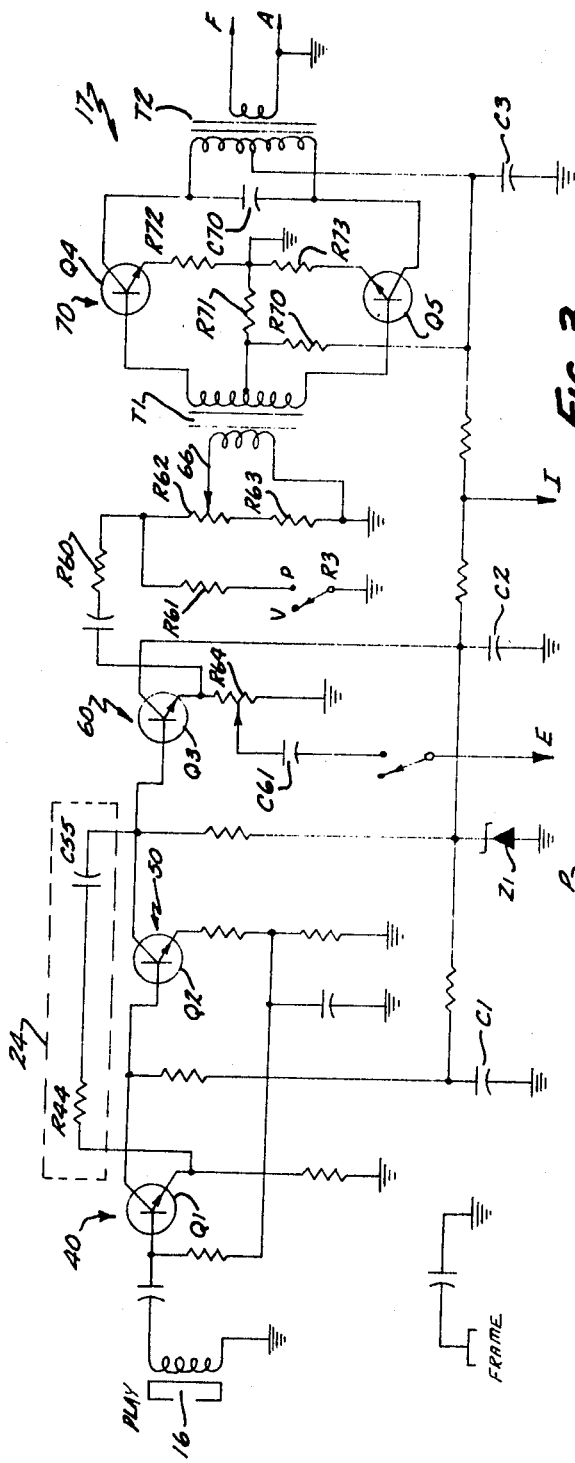
FIG. 3 is a schematic drawing of a preferred transistorized version of the recorder playback amplifier.

The playback amplifier 17 of FIG. 1 is shown in detail in FIG. 3, wherein is seen a transistorized version of an essentially standard amplifier, comprising four stages of amplification, designated 40, 50, 60 and 70. Operating B+ voltage, supplied through circuit connection point I from the recorder control circuit 3, is regulated by Zener diode means Z1, filtered by the capacitors C1, C2, and C3, and supplied to the four amplification stages in the manner indicated. A feedback loop 24, composed of capacitor C55 and resistor R44, provides inverse current feedback from the collector of second stage transistor Q2 to the emitter of first stage transistor Q1 in order to stabilize the operation of the amplifier and guard against distortion.

The third stage 60 of the amplifier is an emitter-follower stage, whose output is developed across the combination of resistances R60, R62, and R63 when the system is in play mode. With the system in record mode however, the record mode holding relay contacts R3, within the recorder control circuit 3, are in their energized position, and so have effected connection of circuit connector points V and P (FIGS. 2 and 3), thus completing a circuit which adds resistor R61 in parallel with the normal third stage emitter load indicated above. Since resistor R61 is of a value very considerably less than the series combination of resistors R62 and R63, the resulting parallel combination is effectively only that of resistor R61 alone. As a result of the change in load, the third stage will now develop an output signal of low amplitude as compared to that of the normal operation in the play mode, which is utilized as the muted echo signal to the pilot that recording is taking place, as has been discussed previously.

Regardless of which of the above discussed combination of resistances is being used as a load for the third stage of the amplifier, the output signal produced by the three stages of amplification appears at the primary of coupling transformer T1 with an amplitude determined by the position of the movable contact 66 of resistor R62, which latter component provides the playback amplifier with a volume control. External adjustment of the movable contact 66 of resistor R62 is performed by turning the knob 67 of FIG. 5.

The signal level selected by the volume control appears across coupling transformer T1 and is supplied to the push-pull output stage 70 of the playback amplifier 17, composed of transistors Q4 and Q5, bias resistors R70, R71, R72 and R73, by-pass capacitor C70, and the output, transformer T2. The playback amplifier output, available from the secondary of output transformer T2 at circuit connector points F and A is supplied to the aircraft amplifier 2 for transmission by the transmitter 6 and antenna 7 to a remote control station 99, and/or the headphones 4a or speaker 4b for listening within the aircraft, at the option of the pilot, as has been previously amply described in connection with FIG. 1.

Record circuit

Figure 4:
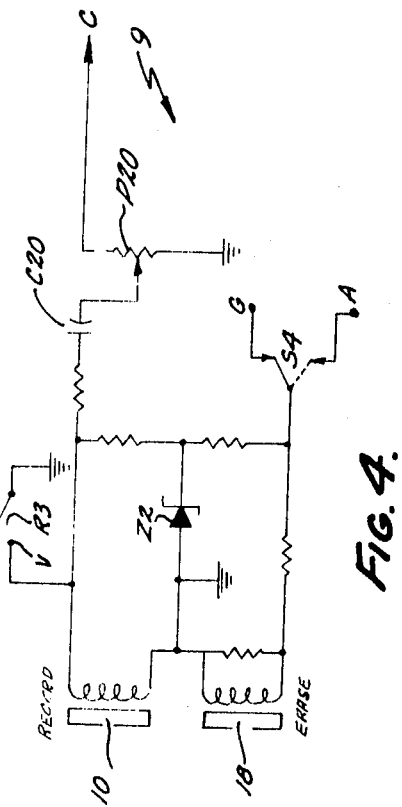
FIG. 4 is a schematic diagram of the record circuit, comprising the record and erase input network.

The record circuit 9 of FIG. 1 is shown in detail in FIG. 4 and consists of a magnetic recording head 10, a magnetic erase head 18, record mode holding relay contacts R3 which control circuit connector points P and V, a lockout switch S4 (shown also in FIG. 6) which controls circuit connector points G and A, a regulating diode Z2 preferably of the Zener type, and interconnecting circuitry including bias-setting resistors, a blocking capacitor C20, an input signal level adjusting potentiometer P20, and signal input circuit connector point C.

The magnetic recording head 10 of the record circuit, in modes other than record, is rendered inoperative by the action of the record mode holding relay contacts R3, whose function is to maintain the magnetic recording head 10 at zero potential by connecting it to ground through circuit connector point V, as shown in FIG. 4. When it is desired to record a message, the record mode selecting control switch R shown in FIG. 5 is momentarily depressed, and the self-energizing record mode holding relay coil K2 opens its contacts R3, thereby rendering the magnetic recording head 10 responsive to the incoming signal by opening the ground connection at point V.

The record circuit receives its operating voltage through circuit connection point G from the recorder control circuit 3. The operating voltage so introduced is stabilized and regulated by the operation of Zener diode Z2, and serves to energize the erase head 18.

Instrument mechanism

In FIGS. 6 and 6a is shown a preferred embodiment of the mechanism used in the selection of different recording channels. The channel select knob 25, shown also in FIG. 5, provides rotary positioning of a cam or eccentric wheel 26, which motion is translated into vertical movement by the cam follower 27 and linkage means 28. This vertical movement is transmitted by a lever 30 pivotally mounted in suitable bracket means 29 to the head-positioning rod 32, by a suitable attachment therebetween, the head-positioning rod being biased against the action of the lever 30 by spring means 31. The head-positioning rod 32 will thus be moved vertically in suitable increments and will thereby place the attached magnetic heads 10, 16, and 18 in any of a series of desired positions adjacent the multi-channel magnetic recording tape 11.

The bottom extremity of the head-positioning rod 32 is suitably beveled so as to slidably engage and actuate a lockout switch S4, shown schematically in FIG. 2. When the head-positioning rod 32 is in the lower extremities of its travel and the lockout switch S4 actuated, the record mode actuating relay coil K2 of FIG. 2 will be connected to ground through circuit connection point A (see FIGS. 2 and 4), thereby effectively eliminating any possibility of record or erase function over a predetermined area of the tape, which may include one or more channels, upon which may be permanently recorded desired information of common usage, such as check lists and the like.

The channels selected in the manner just described are indicated to the operator by a suitable identification symbol (such as "1," "2," "3" and "Check List") attached to the rotary cam means 26 or the cam follower 27, the symbol for the selected channel appearing visibly within the display aperture 41 of FIG. 5.

The dashed lines 150 of FIG. 6 point out a preferred embodiment of one of the recorder mode-selecting relays K1, K2, or K3, along with its actuating push-button control P, R, or W, shown also in FIG. 5. The assembly within the dashed lines 150 is shown in detail in FIG. 6b, where it will be seen that the selection of a desired mode of operation is inaugurated by depressing the appropriate control push-button. The inner end of the push-button serves to contact and move the contact linkage means 151 and the insulating block 152 attached thereto, upon which are mounted the contact-bearing arms for that particular relay, designated here 153 collectively, and the armature or holding member 154, so that the latter is moved into contact with pole piece 155 and the contacts 153 are placed in their energized position (see FIG. 2).

Since, as previously discussed, the stop switch S1 of FIG. 2 is always closed unless intentionally opened, operating voltage within the recorder control circuit 3 immediately establishes through the relay contacts the various circuit paths discussed above in connection with FIG. 2, one of which always energizes the relay holding coil, designated for convenience here as K3. With the holding coil energized, a magnetic circuit is set up which flows through the pole piece 155, the mounting member 156, the armature or holding member 154 (connected to the mounting member 156 through a sliding contact therebetween), and again to the pole piece 155, thus completing the magnetic circuit.

Since these results follow instantaneously upon depression of the push-button control P, the control button may be released immediately and the selected mode will automatically remain in operation under the influence of the magnetic holding circuit just described. In this condition, the mode selected will continue to operate until operating voltage is removed from the holding coil, as by a momentary depression of the stop switch S1, or, at the end of a given tape channel, the operation of the automatic stop switch S2, discussed previously in connection with the recorder control circuit of FIG. 2. When operating voltage is removed by one of these two events, the return spring 157 will automatically break the magnetic contact between the pole piece 155 and the holding member 154, returning the latter, the contacts 153, and the contact linkage means 151 all to their original unactuated position. It will readily be seen that this unique design for holding relay operation eliminates a great deal of the extra switching mechanisms and circuitry normally employed in relay circuits of this general kind.

In FIG. 7 is shown the mechanical arrangement and positioning of the switches S2 and S3 and their actuating members, which, in conjunction with the recorder control circuit of FIG. 2, provide for the automatic stop and automatic rewind functions described previously. The switches S2 and S3 are actuated by cam elements 38a and 39a, which follow the movement of the pivotally mounted, spring biased feeler arms 38 and 39, to which they are suitably attached. The feeler arms 38 and 39 are biased against the tape and thus gage the amount of tape on the reel, thereby directly monitoring the amount of tape 11 wound and unwound on and from the reels 12 and 13 as the tape is driven by the capstan shaft 36 and pressure roller 37, described more fully in my copending application Serial No. 323,020, filed November 12, 1963, past the magnetic heads 10, 16 and 18, on its path around the positioning idler pulleys 34 and 35 to the reels.

For example, before the tape has reached its allowable record or play run the feeler arm 39 is located radially inwardly of the reel 12, as shown in FIG. 7, and switch S3 is in the open position shown by the solid line of FIG. 2. Simultaneously switch S2 is also in the position shown by the solid line of FIG. 2. Now, when the tape reaches the end of its allowable run, feeler arm 39 will have been pivoted radially outwardly an amount sufficient to actuate switch S3, so that its movable contact is placed in the closed position shown in phantom in FIG. 2, switch S2 remaining in the position shown by the solid line of that figure. Actuation of switch S3 causes the tape to be rewound, in the manner previously described, until feeler arm 38, sensing the build-up of tape on reel 13, has been pivoted radially outwardly to a position where it actuates switch S2, whose contacts then assume the position shown by the phantom line of FIG. 2, whereby the rewinding operation is terminated.

It will be noted that as the tape begins to be rewound, feeler arm 39 will be moved a distance radially inwardly of reel 12 sufficient to open switch S3. Thus, when the movable contact of switch S2 has been actuated to the phantom line position, the rewind mode holding relay coil K1 will be de-energized. It will also be noted that when the contacts of switch S2 are in the position shown by phantom lines, and when relay coil K1 is de-energized, the circuit through the green indicating light 21 is closed to ground through rewind relay contacts W3 and the contacts of switch S2, thus causing this light to become illuminated, thereby indicating to the operator that the unit is ready for record or play modes of operation. In connection with the foregoing description of the automatic rewind and automatic stop features, it should also be noted that the diode D1 is provided to prevent short circuiting of the rewind relay coil K1 during the brief period during which the movable contact of switch S3 is in the closed (phantom) position.

Operation

The operation of the integrated communication system and the method of aircraft control herein disclosed is as follows. While flying an aircraft a pilot will often desire flight instructions and information from an airport tower or FAA ground control center. Upon wishing to obtain such information, the pilot will set his mode select switch 8 to the "transmit" position and speak into his microphone 1. The message so spoken will be amplified by the aircraft amplifier 2 and transmitted by the aircraft transmitter 6 and the aircraft antenna 7 to the desired FAA control station 99, where it is received by the control station antenna 98. Anticipating a reply from the FAA ground control station, the pilot moves his mode switch 8 to the "receive" position, and awaits his requested instructions. It the pilot desires to record the forthcoming instructions and flight information, as is ordinarily the case, all he need do is momentarily depress the record mode selecting pushbutton control R. This will inaugurate the switching functions within the recorder control circuit 3 discussed in the previous description, thereby supplying operating voltage to the playback amplifier 17 via circuit connection point I, supplying operating voltage to the record circuit 9 through circuit connection point G, supplying energizing voltage to the motor control circuit 19 and the motor 14 through circuit connection point N, and, through the record mode relay contacts R3, opening the connection at circuit connector points P and V (FIG. 4) which previously maintained the magnetic recording head 10 at zero potential. In this active condition, the record circuit 9 is energized and will be responsive to incoming signals from its circuit connector point C. Since the motor control circuit 19 and therefore the motor 14 are receiving operating voltage, the motor will begin to turn and to wind magnetic tape past the adjacent magnetic heads 10, 16 and 18, and the pilot will be made aware of this fact by the red indicating lamp 21 on the recording instrument face (FIG. 5) which is now lighted.

As the FAA ground control station 99 broadcasts the desired information and instructions to the aircraft over its antenna 98, the transmission will be received by the aircraft antenna 7 and the aircraft receiver 15, and will receive preliminary amplification by the aircraft amplifier 2. The message so received will be heard by the pilot on either the earphones 4a or the speaker 4b, as determined by the position of the select switch 5. This message will also be coupled to the record circuit 9 through the recorder control circuit 3 by means of circuit connector point C, and will therefore be automatically recorded upon the magnetic tape 11 by the recording head 10.

As noted above, the playback amplifier 17 has been energized at its circuit connector point I by the selection of the record mode of operation. Additionally, when record relay contacts R3 were actuated so as to open the circuit connector points P and V and remove the ground connection from the recording head 10, circuit connector point P was simultaneously connected to ground (FIG. 3), thereby adding resistor R61 in parallel with the normal load of the emitter-follower third stage 60 of the playback amplifier 17. In this condition, whatever signals are introduced to the playback amplifier 17 by its magnetic playhead 16 will receive a markedly lower degree of amplification than would be the case with the system in its normal play mode. Additionally, the play magnetic head 16 is displaced a fixed distance from the record head 10. Thus, the signals picked up by the playhead from the magnetic tape are delayed slightly in time relative to the moment of their prior recordation.

It will therefore be seen that the message containing flight instructions emanating from the ground control station 99 is simultaneously being heard by the pilot and recorded in the precise state in which it was received by the aircraft. The delayed and muted signal reproduced by the playhead 16 and playback amplifier 17 is also heard by the pilot so that he may be assured that the incoming message is being properly recorded, as he desires.

As has been previously discussed, once a given mode of the system has been inaugurated, the magnetic holding circuits within the various actuating relays will automatically continue that mode of operation in effect until the stop switch S1 is depressed. Accordingly, the pilot may discontinue recordation of the incoming message at its conclusion, or at any previous point desired by simply touching the said stop switch. Normally the pilot would of course record the entire message received from the ground control station, and then reiterate the message received back to the sending source so as to check the accuracy of the message transmitted as well as the accuracy with which it was transmitted. By use of the invention disclosed herein, this process may easily be accomplished. All that need be done after recording activity has ceased is to actuate the rewind mode selecting control button W, change the mode select switch 8 to the transmit position during the very brief time necessary to rewind the magnetic tape, and then depress the play mode actuating control button P. In this mode the record relay contacts R3 are of course de-energized, so that circuit connector points P and V are once again joined, thereby removing resistor R61 from the output of the third stage 60 of the playback amplifier 17 and thereby allowing for a normal output from this amplifier, while once again connecting the magnetic recording head 10 to ground potential and effectively eliminating any possibility of erase or record operation over this portion of the tape. The message just transcribed onto the tape will therefore be picked up by the magnetic playhead 16, amplified by the playback amplifier 17 and the aircraft amplifier 2, and transmitted from the aircraft by means of the aircraft transmitter 6 and the aircraft antenna 7. The pilot may, if he desires, listen to this message being replayed to the ground control station 99 by means of his earphones 4a or a speaker 4b.

It should be very obvious therefore that a method and apparatus has been made available by this invention which enables rapid, exact, and effortless receipt and storage of aircraft guidance information, and moreover, augments this basic system with the indispensable element of instant reiteration and retransmission of received messages back to their sending source so that erroneous portions of these messages may be quickly discovered and eliminated, and absolute accuracy insured. The invention does not cease here, however, for it also provides the means whereby a pilot may just as easily record and retain the contents of messages he is transmitting from the aircraft, or indeed may simply make aural memorandums of information he will subsequently need during his flight and which he wishes to have close at hand. For such operation, all that the pilot need do is turn off the aircraft transmitter 6, inaugurate the record mode of system operation by depressing the record actuating control button R, and speak into his microphone 1.

An additional and valuable aspect of the present invention lies in its incorporation of one or more channels of permanently recorded information of common and repeated usage, such as check lists and the like. Such pre-recorded channels may be utilized by merely rotating the channel select knob 25 (FIGS. 5 and 6) until the desired symbol appears in the viewing aperture 41, instituting the rewind mode by depressing the appropriate control button on the face of the instrument so as to insure that replay begins at the beginning of such a pre-recorded message, and then depressing the play mode select switch P in the manner normally utilized to effect replay of any recorded message. Since, as has been discussed previously, the head-positioning rod 32 upon which are mounted all the magnetic heads 10, 16 and 18 is so constructed as to actuate the lockout switch S4 (FIGS. 2 and 6) when permanently recorded channels are desired to be utilized, so that the record circuit 9 is completely de-energized during this period, there is no possibility of destructive replay of permanent channels of information, due to the effective disabling of the record and erase heads 10 and 18. Check lists and the like may therefore be utilized time and time again, whenever required or desired by the pilot.

After the pilot has received and simultaneously recorded his requested instructions and flight information from a given ground control station 99, and before he replays the recorded message back to the said ground control station as a reiteration, it is of course necessary that the tape be rewound from the point at which the message ended to the point at which the recording began. Accordingly, the system makes provision for a practically instantaneous rewind operation. At the conclusion of the message being recorded, the pilot need only depress the rewind mode select push-button control W (FIG. 5), which will institute the switching operations within the recorder control circuit 3 of FIG. 2 discussed previously. The recorder control circuit now supplys operating voltage to the motor control circuit 19 and motor 14, the red indicating lamp 21, and the rewind clutch solenoid L1. These operations serve to effect the instantaneous rewind of tape through the operation of the unique capstan driving means 34 of FIG. 7 as is described at length in my co-pending application, Serial No. 323,020, filed November 12, 1963. In addition to the switching functions mentioned above, the recorder control circuit 3 has disconnected operating voltage from the playback amplifier 17 which previously appeared at circuit connector point I and also removed operating voltage from circuit connector point G within the record circuit 9, thereby effectively precluding any record or erase operation over this portion of the tape 11. Finally, as the rewind clutch solenoid L1 was energized, the automatic stop switch S2 became armed, and stands ready to automatically terminate the rewinding action when the beginning of the channel being rewound is reached, since at this point the switch S2 will remove the holding voltage from the coil of the rewind relay K1. The pilot has therefore effortlessly accomplished his purpose, and the system now stands ready to replay the recorded message upon actuation of the play mode select control button P in the manner described above.

When the tape has reached the end of its allowable run while the system is being operated in play or record modes, the automatic rewind switch S3 (FIGS. 2 and 7) will be actuated, causing automatic instantaneous rewind of the tape on reel 13. The fact that automatic rewinding is in progress will be communicated to the pilot by means of the red indicating lamp 21, which remains lighted throughout this brief period. When the tape has been rewound on reel 13 the switch S2 is actuated (in the manner described previously) and will end the rewind function. The red indicating light 21 then goes out and the green indicating light 20 goes on, indicating that the tape has been completely rewound and the system is in the "ready" position for record or play modes of operation.

It is to be understood that while a preferred embodiment of the present invention has been shown and discussed herein, this is exemplary only and obviously various modifications may be made in both construction and arrangement of the elements comprising the system without departing from the spirit of the invention, the scope of whose novel features is set forth in the appended claims.

I claim:

1. A method of aircraft radio communications for flight controlling an aircraft by a control station comprising the steps of providing a two-way radio transmission system between the aircraft and control station, said system having receiver and transmitter networks at said control station and receiver and transmitter networks in said aircraft, said receiver networks adapted for producing aural signals to the operators at said control station and in said aircraft; providing a recorder in said aircraft receiver and transmitter networks, said recorder being connected in said aircraft networks for recording said aural signals transmitted from said control station networks as such signals are being received by said aircraft receiver network and heard by the operator therein; transmitting aural instruction signals from said control station networks to said aircraft networks; receiving said instructions at said aircraft receiver network and simultaneously recording the same on said recorder; simultaneously with the receipt of said signal by said aircraft network playing said recorded signal only slightly time delayed and muted so as to be heard in the background by the aircraft operator thereby indicating to the aircraft operator that the signal is being recorded at said aircraft networks; and transmitting the recorded signal back to the control station networks only after the control station's instructions are complete.

2. A method of aircraft radio communications for flight controlling an aircraft by a control station comprising the steps of providing a two-way radio transmission system between the aircraft and control station, said system having receiver and transmitter networks at said control station and receiver and transmitter networks in said aircraft, said receiver networks adapted for producing aural signals to the operators at said control station and in said aircraft; providing a recorder in said aircraft receiver and transmitter networks, said recorder being connected in said aircraft networks for recording said aural signals transmitted from said control station networks as such signals are being received by said aircraft receiver network and heard by the operator therein; transmitting aural instruction signals from said control station networks to said aircraft networks; receiving said instructions at said aircraft receiver network and simultaneously recording the same on said recorder; simultaneously with the receipt of said signal by said aircraft network playing said recorded signal only slightly time delayed and muted so as to be heard in the background by the aircraft operator thereby indicating to the aircraft operator that the signal is being recorded at said aircraft networks.

(References on following page)

References Cited by the Examiner

UNITED STATES PATENTS

| | | | |
|---|---|---|---|
| 1,587,566 | 6/1926 | Tuthill | 318—301 |
| 1,677,296 | 7/1928 | Rosenbaum | 325—6 |
| 1,723,040 | 8/1929 | Hunter | 318—301 |
| 1,798,066 | 3/1931 | Clement | 325—6 |
| 2,966,552 | 12/1960 | Campbell et al. | 179—100.1 X |
| 2,978,676 | 4/1961 | Spencer | 325—64 X |
| 3,059,062 | 10/1962 | Ojala | 179—100.1 |
| 3,165,595 | 1/1965 | Noshiro | 179—100.2 |
| 3,167,693 | 1/1965 | Hayward | 317—165 |
| 3,196,214 | 7/1965 | Knoth | 179—100.2 |
| 3,210,041 | 10/1965 | Mitts | 317—165 |

DAVID G. REDINBAUGH, *Primary Examiner.*

JOHN W. CALDWELL, *Examiner.*